United States Patent
Rapeaux et al.

(10) Patent No.: US 9,737,957 B2
(45) Date of Patent: Aug. 22, 2017

(54) METHOD FOR TREATING THE SURFACE OF A WALL IN AN ELECTRICAL PROTECTION APPARATUS AND APPARATUS COMPRISING AT LEAST ONE WALL TREATED ACCORDING TO SAID METHOD

(71) Applicant: SCHNEIDER ELECTRIC INDUSTRIES SAS, Rueil Malmaison (FR)

(72) Inventors: Michel Rapeaux, Grenoble (FR); Marc Rival, Grenoble (FR); Salaheddine Faik, Grenoble (FR)

(73) Assignee: SCHNEIDER ELECTRIC INDUSTRIES SAS, Rueil-Malmaison (FR)

( * ) Notice: Subject to any disclaimer, the term of this patent is extended or adjusted under 35 U.S.C. 154(b) by 0 days.

(21) Appl. No.: 15/037,368

(22) PCT Filed: Sep. 30, 2014

(86) PCT No.: PCT/FR2014/052455
§ 371 (c)(1),
(2) Date: May 18, 2016

(87) PCT Pub. No.: WO2015/075332
PCT Pub. Date: May 28, 2015

(65) Prior Publication Data
US 2016/0297030 A1    Oct. 13, 2016

(30) Foreign Application Priority Data
Nov. 19, 2013  (FR) ..................................... 13 61352

(51) Int. Cl.
*B23K 26/00* (2014.01)
*B23K 26/352* (2014.01)
(Continued)

(52) U.S. Cl.
CPC ...... *B23K 26/0084* (2013.01); *B23K 26/0624* (2015.10); *B23K 26/352* (2015.10);
(Continued)

(58) Field of Classification Search
None
See application file for complete search history.

(56) References Cited

U.S. PATENT DOCUMENTS

| 5,281,776 A | 1/1994 | Morel et al. |
| 2001/0007318 A1 | 7/2001 | Rival et al. |

(Continued)

FOREIGN PATENT DOCUMENTS

| FR | 2 682 531 A1 | 4/1993 |
| FR | 2 803 686 A1 | 7/2001 |
| WO | WO 2013/030343 A1 | 3/2013 |

OTHER PUBLICATIONS

International Search Report issued Dec. 17, 2014, in PCT/FR2014/052455 filed Sep. 30, 2014.
(Continued)

*Primary Examiner* — Shamim Ahmed
(74) *Attorney, Agent, or Firm* — Oblon, McClelland, Maier & Neustadt, L.L.P.

(57) ABSTRACT

A method for treating a surface of a wall, that can reduce conductivity thereof, the surface being located in a first area located near a second area in which an electric arc is likely to occur in an electrical protection apparatus, the first area constituting an area for recondensing cutting residue. The method includes micro-texturizing the surface to promote inhomogeneity in recondensation of cutting residue, by growing deposits of the residue on the surface to create islands of residue and thus to restrict conductivity of the resulting deposit.

10 Claims, 4 Drawing Sheets

Figure 1:
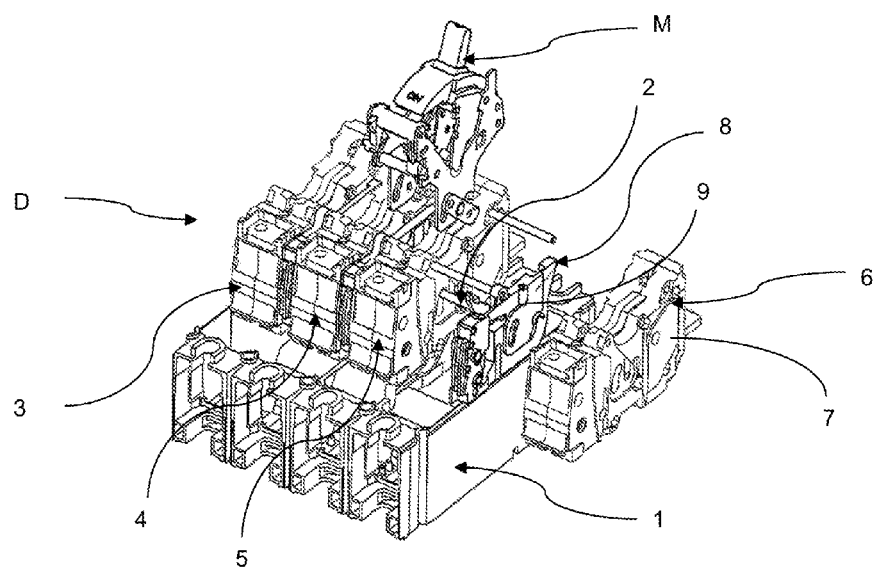

(51) Int. Cl.
*H02B 1/04* (2006.01)
*B29C 37/00* (2006.01)
*H01H 73/18* (2006.01)
*B23K 26/362* (2014.01)
*B23K 26/402* (2014.01)
*B23K 26/0622* (2014.01)
*H01H 71/02* (2006.01)
*B29C 59/02* (2006.01)
*B23K 103/00* (2006.01)
*B23K 101/36* (2006.01)

(52) U.S. Cl.
CPC .......... *B23K 26/362* (2013.01); *B23K 26/402* (2013.01); *B29C 37/0053* (2013.01); *H01H 71/025* (2013.01); *H01H 73/18* (2013.01); *H02B 1/04* (2013.01); *B23K 2201/36* (2013.01); *B23K 2203/42* (2015.10); *B29C 2059/023* (2013.01); *B29K 2995/0093* (2013.01)

(56) References Cited

U.S. PATENT DOCUMENTS

| | | | | |
|---|---|---|---|---|
| 2009/0095922 | A1* | 4/2009 | Lee | G03F 1/72 250/492.1 |
| 2010/0219506 | A1* | 9/2010 | Gupta | B23K 26/0084 257/618 |
| 2011/0287203 | A1* | 11/2011 | Victor | B29C 37/0053 428/36.9 |
| 2013/0020297 | A1* | 1/2013 | Gupta | B23K 26/12 219/121.72 |
| 2013/0189548 | A1* | 7/2013 | Schaefer | H01M 2/34 429/7 |
| 2013/0251948 | A1* | 9/2013 | Lyons | B32B 5/16 428/148 |

OTHER PUBLICATIONS

French Search Report issued Aug. 14, 2014, in French Application 1361352 filed Nov. 19, 2013.

* cited by examiner

METHOD FOR TREATING THE SURFACE OF A WALL IN AN ELECTRICAL PROTECTION APPARATUS AND APPARATUS COMPRISING AT LEAST ONE WALL TREATED ACCORDING TO SAID METHOD

The present invention relates to a method for treating the surface of a panel in order to reduce its conductivity, said surface being located in an area called a cold area, said area being located near an area in which an electric arc may occur in an electric protection apparatus, said cold area forming an area of recondensation of switching residues.

Efforts to achieve miniaturization, combined with improved performance and the development of low-cost modular architecture, for present-day circuit breakers have encountered the problem of poor post-switching insulation between the inputs and the outputs of low voltage circuit breakers after an in-service short-circuit test.

This problem arises mainly as a result of two phenomena:

Firstly, during the short-circuit current switching phenomenon, there is an ablation of materials located in the vicinity of the contacts in the arc extinguishing chamber. The factors contributing to this phenomenon are the conductive elements which are not oxidized during switching (mainly silver) and the carbonized elements resulting from the combustion of the insulating panels. The elements Fe, Cu, W and Ni which are present make only a small contribution to the degradation of the dielectric insulation. Secondly, condensation of the vaporized elements described above occurs in the areas remote from what is known as the switching area. These condensation areas are mainly located in the interstices between the various casings forming the circuit breaker.

The materials forming these "cold" areas are subjected to numerous thermal and mechanical stresses, which rule out the use of materials having the best dielectric performance.

To resolve this problem and minimize the leakage current, special measures have been taken to reduce the unfavorable effects of this recondensation. Thus, the deposition of paints, varnishes or silicone- or PTFE-based oils has been carried out. The major drawbacks of these products are the incomplete control of the exact composition of these components, the volatility of some components during deposition, problems of adhesion to a poorly prepared surface, and the need for compatibility with the RoHS and REACH requirements.

The present invention resolves these problems and proposes a method for reducing the conductivity of the surfaces of panels located in cold areas of an electric protection apparatus, in order to respond to the post-switching dielectric requirements while making allowance, primarily, for the thermal and mechanical stresses on the materials of these panels, in view of the requirements for successful arc quenching.

To this end, the present invention proposes a treatment method of the aforementioned kind, this method being characterized in that it consists in carrying out micro-texturing on this surface so as to promote inhomogeneity of the recondensation of the switching residues by growing deposits of these residues on the surface in such a way as to create islands of residues and thus limit the conductivity of the resulting deposit.

Preferably, the deposits are grown in a direction substantially perpendicular to the plane of said surface.

According to a particular characteristic, a superhydrophobic surface is produced by this method of micro-texturing, the method being optimized so as to greatly reduce the surface tensions on the surface, thereby reducing the number of nucleation sites and promoting the growth of deposits along the vertical axis.

According to another characteristic, this method is a laser micro-texturing method.

According to another characteristic, this method is a laser micro-texturing method in which the pulse duration is less than 1 nanosecond and the peak power delivered is greater than 10 GW.

According to another characteristic, the aforesaid surface micro-texturing is carried out directly on the aforesaid panel, or is performed by molding the component including the aforesaid panel by means of a mold in which the surface micro-texturing is the opposite of the desired micro-texturing on the component.

According to another characteristic, this panel is made of a plastic material.

The present invention also proposes an electric protection apparatus comprising at least one panel located in a recondensation area remote from the arc area, the surface of this panel having been modified by a treatment method having the aforementioned characteristics considered singly or in combination, so as to improve the post-switching insulation of the apparatus.

According to another particular characteristic, the aforesaid apparatus is a low voltage electric circuit breaker.

According to another characteristic, this apparatus is a multi-pole apparatus comprising a plurality of single-pole switching units, and the aforesaid panel belongs to a spacer located between two juxtaposed single-pole units, or belongs to a dielectric screen placed between the separators, on the one hand, and the movable contact member in the open position of the contacts, on the other hand.

Figure 1A:
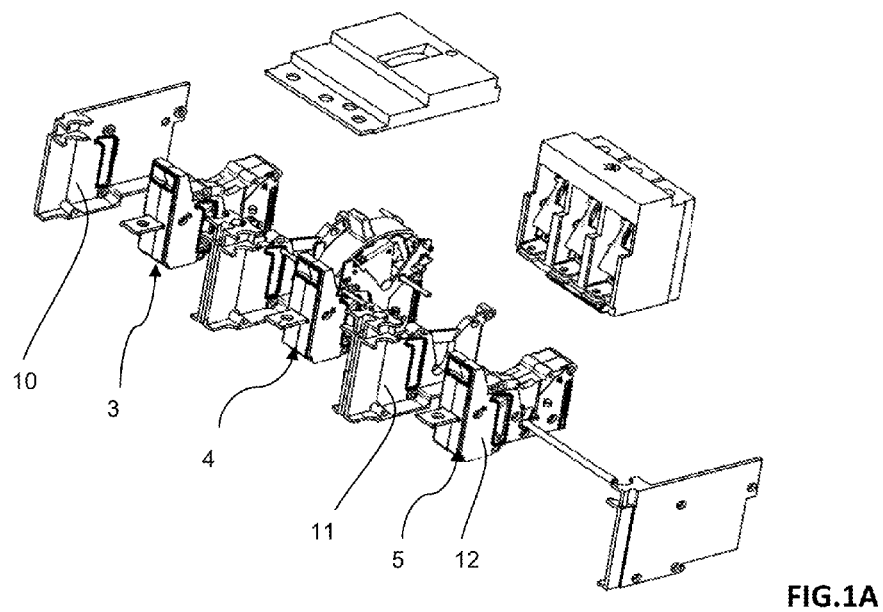
Figure 2:
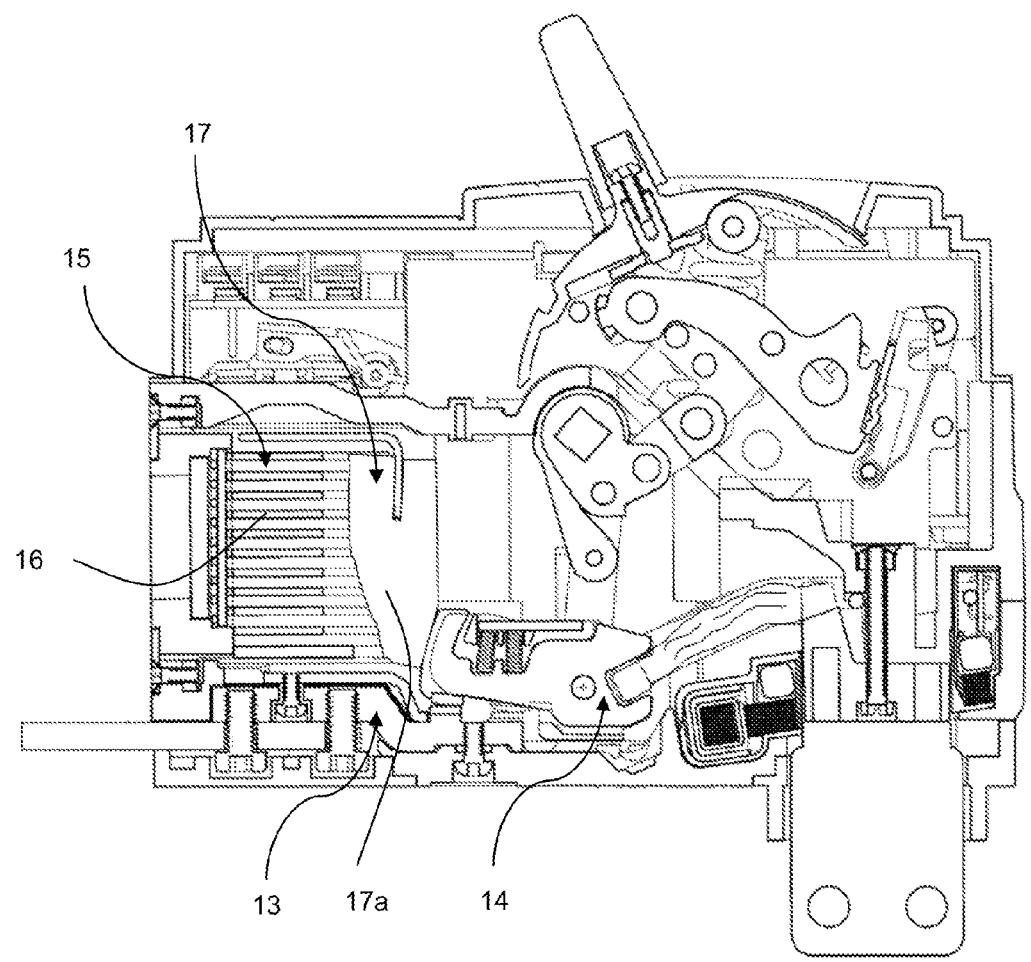
Figure 3:
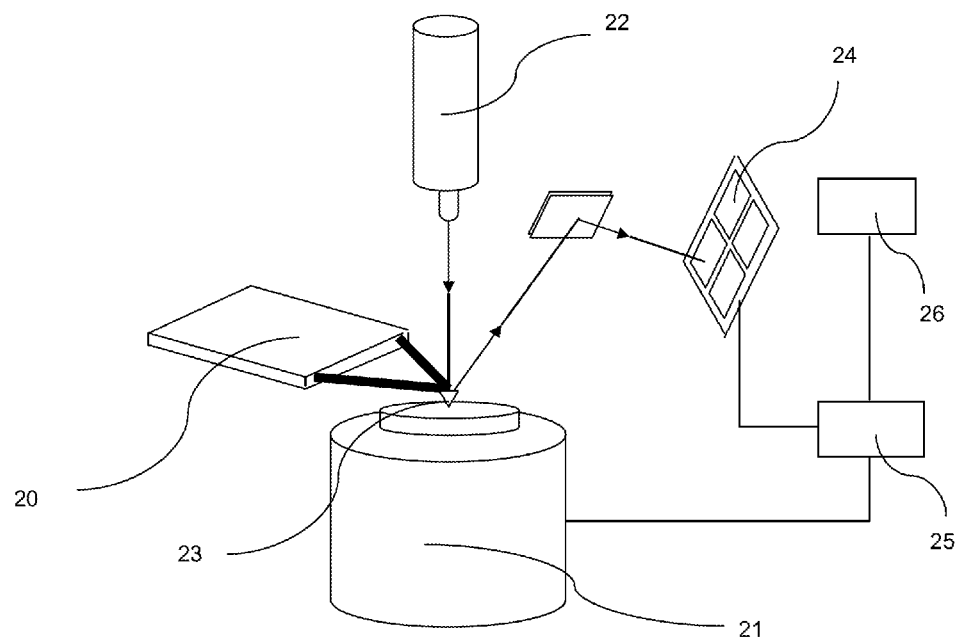
Figure 4:
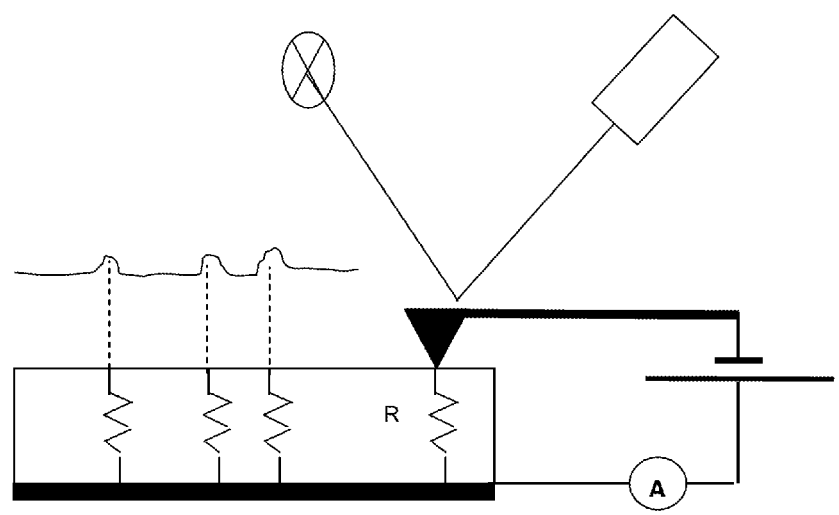
Figure 5:
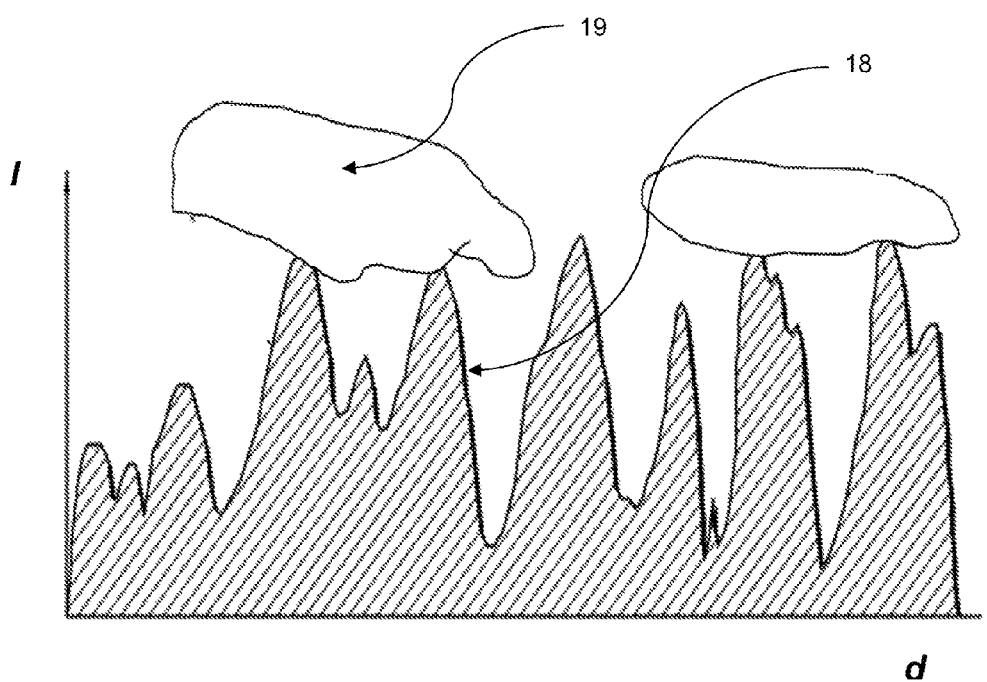

However, other advantages and characteristics of the invention will be more apparent from the following detailed description which refers to the attached drawings, provided solely by way of example, in which:

FIG. 1 is a partial exploded perspective view of a circuit breaker according to the invention, comprising a plurality of panels whose surfaces are to be micro-textured by the method according to the invention, FIG. 1*a* is a partial exploded perspective view, showing a number of these panels more precisely, FIG. 2 is a sectional view of the circuit breaker according to FIG. 1, in a plane substantially perpendicular to the fixing plane of the apparatus, FIG. 3 is a schematic view showing the production of the topographic map of the surface micro-textured according to the invention, using an atomic force microscope, FIG. 4 shows the production of the resistive map of the micro-textured surface contaminated by the recondensation of the switching contaminants, for the purpose of optimizing the micro-texturing of the surface, and FIG. 5 shows a cross section through the micro-textured surface after switching, with a discontinuous deposition of pellets of conductive material on the surface.

FIG. 1 shows a known multi-pole low voltage circuit breaker D, as described in the patent FR 2 682 531, formed by the assembly of single-pole units 3, 4, 5, 6, each formed by a casing 1 of molded insulating material, which houses contacts in the form of moving contact bridges, interacting with two fixed contacts and two quenching chambers. The contact bridge is held by a portion of bar, and the various portions of bar are joined mechanically by eccentric connecting bars 2, controlled by a mechanism M common to all the single-pole units 3.

This figure shows two examples of walls located in what are called cold areas, that is to say areas which are remote from the electric arc when the latter occurs, and which have surfaces forming recondensation surfaces for the switching gases. These surfaces comprise a side face 7 of a single-pole unit 6 and an outer surface 8 belonging to a spacer 9 interposed between two juxtaposed single-pole units 5, 6. FIG. 1a shows a set of three single-pole switching units 3, 4, 5 arranged in an opposite orientation to the orientation of the circuit breaker of FIG. 1. This figure shows other side walls of single-pole units and spacer plates having outer surfaces 10, 11, 12 forming surfaces for the recondensation of switching gases.

FIG. 2 shows a pole belonging to an electric circuit breaker equipped with an arc quenching chamber such as that described in patent FR 2 803 686.

This pole comprises a fixed contact member 13, a movable contact member 14, and an arc quenching chamber 15 having two lateral panels, separators 16, a front opening in the proximity of the contact area of the fixed contact member and a pair of lateral dielectric screens 17 which laterally limit the front opening of the chamber. Each lateral dielectric screen is arranged so as to be interposed laterally between the separators 16 and the movable contact member in the open position. The outer surfaces 17a of these screens provide another example of application of the method according to the invention, this method being described below.

The method according to the invention consists in modifying the surface affected by the recondensation of the switching gases in order to obtain minimum surface conductivity after the deposition of contamination due to the quenching of an electric arc in a low voltage circuit breaker. According to a particular embodiment of the invention, this surface is made superhydrophobic by a method of surface micro-texturing, thus promoting inhomogeneity of the recondensation of the switching residues by growing deposits of these residues on the surface in such a way as to create islands of residues and thus limit the conductivity of the resulting deposit. It will be advantageous to consult FIG. 5 which shows the micro-textured surface 18 and the islands 19 of residues, these islands being formed by pellets of material such as silver, in the form of a section showing the wavelength I of the texture as a function of the distance d along the specimen.

Advantageously, this superhydrophobic surface is produced by a micro-texturing method.

The geometry used for micro-texturing is optimized by measuring the surface resistance of the surface layer, the optimum surface being the surface which is most inhomogeneous in dielectric terms after the deposition of the contamination. In other words, the aim is to obtain a surface on which the decomposition elements of the switching, which are conductive (particularly silver in the non-oxidized form), are recombined in a non-homogeneous way so as to reduce the leakage current between two tested terminals (phase/phase or input/output of an apparatus).

Advantageously, the chosen technology is a method of surface micro-texturing by a femtosecond laser whose pulse duration is very short (typically less than 1 ns) and which delivers a very high peak power (>10 GW). In these conditions, all materials can be sublimated with no thermal effect, particularly the plastic materials used to form the panels subjected to this surface modification.

The texture can be optimized with the aid of an atomic force microscope which can be used to plot the topographic map and the resistive map of the same specimen simultaneously.

This technique, using an atomic force microscope, is shown schematically in FIG. 3, and, being known, will not be described in further detail. This technique uses a silicon lever 20, piezoelectric tubes 21, a laser 22, a point 23 incorporated into the lever, a photodetector 24 for detecting the position of the lever, a control device 25, and a monitoring system 26.

FIG. 4 shows the measurement of current in the surface layer, this measurement representing one of a number of ways of evaluating the surface resistance on this surface, with the aim of producing an optimum surface.

It should be noted that the modifications of texture relate solely to the recondensation surfaces remote from the arc area.

This is because such modifications would be ineffective on the surfaces near the arc, since they are strongly ablated by the arc.

This type of laser treatment can be used to obtain micro-texturing of the plastic surface, particularly in condensation areas called cold areas.

The texture can be modified either directly on the component, or on the mold whose surface micro-texturing will be the negative of the desired micro-texturing.

This micro-texturing is optimized to greatly reduce the surface tensions on the surface, by creating a superhydrophobic surface, thereby reducing the number of nucleation sites and promoting the growth of deposits along an axis substantially perpendicular to the surface of the panel to be textured, as shown, in particular, in FIG. 3. This leads to inhomogeneity of the recondensation of the switching residues, due to the growth of the deposits in isolated islands instead of the growth of a continuous film, thus enabling the conductivity of the resulting deposit to be limited. The invention therefore consists in directly modifying the surface texture of the material from which the panel is made, in order to meet dielectric requirements while enabling allowance to be made primarily for the thermal and mechanical stresses on the material in relation to the requirements for successful quenching.

The invention is applicable to any exterior panel surface whose conductivity is to be reduced and which is located in an area of recondensation of the conductive decomposition elements generated in electric switching.

Evidently, the invention is not limited to the embodiment described and illustrated, which has been provided purely by way of example.

On the contrary, the invention comprises all the technical equivalents of the means described, as well as their combinations if these are created according to the spirit of the invention.

The invention claimed is:

1. A method for treating a surface of a panel to reduce its conductivity, the surface being located in a first area, located near a second area in which an electric arc may occur in an electric protection apparatus, the first area forming an area of recondensation of switching residues, the method comprising:

forming micro-texturing on the surface to promote inhomogeneity of the recondensation of the switching residues, as a result of growth of deposits of the residues on the surface to create islands of residues and thus limit conductivity of the resulting deposit.

2. The treatment method as claimed in claim 1, wherein the deposits of the residues are grown on the surface in a direction substantially perpendicular to the plane of the surface.

3. The treatment method as claimed in claim 1, wherein a superhydrophobic surface is produced by the method of micro-texturing, the method being optimized to reduce surface tensions on the surface, thereby reducing a number of nucleation sites and promoting growth of the deposits along the vertical axis.

4. The treatment method as claimed in claim 1, wherein the method is a micro-texturing method using a laser.

5. The treatment method as claimed in claim 4, wherein the method is a micro-texturing method using a laser whose pulse duration is less than 1 nanosecond and which delivers a peak power of more than 10 GW.

6. The treatment method as claimed in claim 1, wherein the surface micro-texturing is created directly on the panel, or is obtained by molding a component including the panel by a mold in which the surface micro-texturing is opposite of a desired micro-texturing on the component.

7. The treatment method as claimed in claim 1, wherein the panel is made of a plastic material.

8. An electric protection apparatus comprising:
 at least one panel located in a recondensation area remote from an arc area, the surface of the panel having been modified by a treatment method as claimed in claim 1, to improve post-switching insulation of the apparatus.

9. The apparatus as claimed in claim 8, wherein the apparatus is a low voltage electric circuit breaker.

10. The apparatus as claimed in claim 8, as a multi-pole apparatus comprising a plurality of single-pole switching units, and wherein the panel belongs to a spacer located between two juxtaposed single-pole units, or belongs to a dielectric screen placed between separators and a movable contact member in open position of the contacts.

* * * * *